United States Patent
Saito (10) Patent No.: US 7,839,772 B2
(45) Date of Patent: *Nov. 23, 2010

(54) LINE REDUNDANT DEVICE AND METHOD

(75) Inventor: Takashi Saito, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 12/330,256

(22) Filed: Dec. 8, 2008

(65) Prior Publication Data

US 2009/0092044 A1 Apr. 9, 2009

Related U.S. Application Data

(63) Continuation of application No. 10/266,636, filed on Oct. 9, 2002, now Pat. No. 7,477,595.

(30) Foreign Application Priority Data

Oct. 10, 2001 (JP) ............... 2001-312812

(51) Int. Cl.
*G01R 31/08* (2006.01)

(52) U.S. Cl. ....................................... 370/225

(58) Field of Classification Search ........................ None
See application file for complete search history.

(56) References Cited

U.S. PATENT DOCUMENTS

| | | | |
|---|---|---|---|
| 5,903,544 A | 5/1999 | Sakamoto et al. | |
| 6,075,767 A | 6/2000 | Sakamoto et al. | |
| 6,393,026 B1 | 5/2002 | Irwin | |
| 6,724,757 B1 | 4/2004 | Zadikian et al. | |
| 6,856,594 B1 | 2/2005 | Aihara et al. | |
| 6,856,600 B1 | 2/2005 | Russell et al. | |
| 6,882,766 B1 | 4/2005 | Corbalis et al. | |
| 7,035,262 B1 * | 4/2006 | Joshi | 370/395.1 |
| 7,050,391 B1 * | 5/2006 | Mao | 370/218 |
| 7,058,013 B2 | 6/2006 | Furuichi | |
| 7,068,663 B1 | 6/2006 | Adler | |
| 7,085,225 B2 | 8/2006 | Schaller et al. | |
| 7,187,649 B1 | 3/2007 | Mazzurco et al. | |

FOREIGN PATENT DOCUMENTS

| | | |
|---|---|---|
| JP | 8-195756 | 7/1996 |
| JP | 9-74412 | 3/1997 |
| JP | 9-83638 | 3/1997 |
| JP | 9-116555 | 5/1997 |
| JP | 9-247162 | 9/1997 |
| JP | 9-275405 | 10/1997 |

* cited by examiner

*Primary Examiner*—Pankaj Kumar
*Assistant Examiner*—Hicham B Foud
(74) *Attorney, Agent, or Firm*—Harrity & Harrity, LLP (57) ABSTRACT

There is provided a line redundant method for implementation of line switching in a switching matrix, including the bridge step of outputting a data signal to a plurality of redundant lines in the switching matrix, and the selector step of selecting only a data signal, of a plurality of data signals input from another switching matrix other than the switching matrix through the plurality of redundant lines, which is input through a redundant line required in the switching matrix, and not selecting the data signals input to the switching matrix through the lines other than the required redundant line. A line redundant system for implementing this method is also provided.

21 Claims, 7 Drawing Sheets

FIG. 8

LINE REDUNDANT DEVICE AND METHOD

This application is a continuation of U.S. application Ser. No. 10/266,636, filed Oct. 9, 2002, the entire content of which is incorporated herein by reference.

BACKGROUND OF THE INVENTION

1. Field of the Invention

The present invention relates to a selector, line redundant method, and line redundant system which realize line switching in a switching matrix to recover from line troubles and the like and, more particularly, to a line redundant scheme which has a simple hardware arrangement and allows line switching on a port basis.

2. Description of the Prior Art

Recently, demands have arisen for an improvement in the reliability of an ATM (Asynchronous Transfer Mode) switching network with respect to line troubles. As a line redundant scheme in a case wherein ATM switching is realized on a SONET (Synchronous Optical Network) or SDH (Synchronous Digital Hierarchy) network, an APS (Automatic Protection Switching) scheme is available, in which when a failure occurs in a Working route (Working Connection), the route is automatically switched to a protection route (Protection Connection) to continue the communication. As standards for this scheme, Bellcore (Bell Communications Research) standards, ANSI (American National Standards Institute) T1.105.01-1998, ITU-T (International Telecommunication Union-Telecommunication Standardization Sector) G.783, and the like are defined.

There are two types of switching control schemes in APS, namely a physical layer scheme using K1/K2 bytes on a SONET framer as control information for the opposite side and an ATM layer scheme using an OAM (Operation Administration and Maintenance) cell called an APS cell as control information for the opposite side.

The physical layer scheme includes two types of schemes, namely a (1+1) scheme and (1:1) scheme. In this case, in the (1+1) scheme, on the transmission side, a data signal is copied, and the identical data signals are simultaneously sent out to the two connections, i.e., the working route and protection route. On the reception side, the data signal is normally received through the working route. When a trouble occurs on the working route, only the connection on the reception side is switched from the working route to the protection route, thereby continuing the communication of a main data signal.

In the (1:1) scheme, on the transmission side, a main data signal and sub-data signal are respectively received through the working route and protection route. On the reception side, data signals from the two routes are normally received through the respective routes. When a trouble occurs on the working route, the connection is switched from the working route to the protection route on both the sides, i.e., the transmission side and reception side, thereby continuing the communication of the main data signal.

Of the above two types of physical layer schemes, the (1+1) scheme to which the present invention is applied requires a bridge function of distributing a data signal sent to the working route on the transmission side to the protection route as well, a selector function of cutting off a data signal, of data signals input to a switch on the reception side, which is sent from the protection route, and a function of performing line switching control on a port on the opposite side by using K1/K2 bytes on a SONET frame.

For example, a conventional arrangement for a line redundant system for realizing APS is disclosed in Japanese Unexamined Patent Application Publication (KOKAI) No. 9-275405. In an embodiment in this reference, the arrangement of a dual redundant system in an ATM switch is described. A selector (input cutoff circuit) and bridge (output-side distribution circuit) exist on a common switching fabric.

The operation of this conventional system will be described below with reference to FIGS. 1, 2, and 3.

Figure 1:
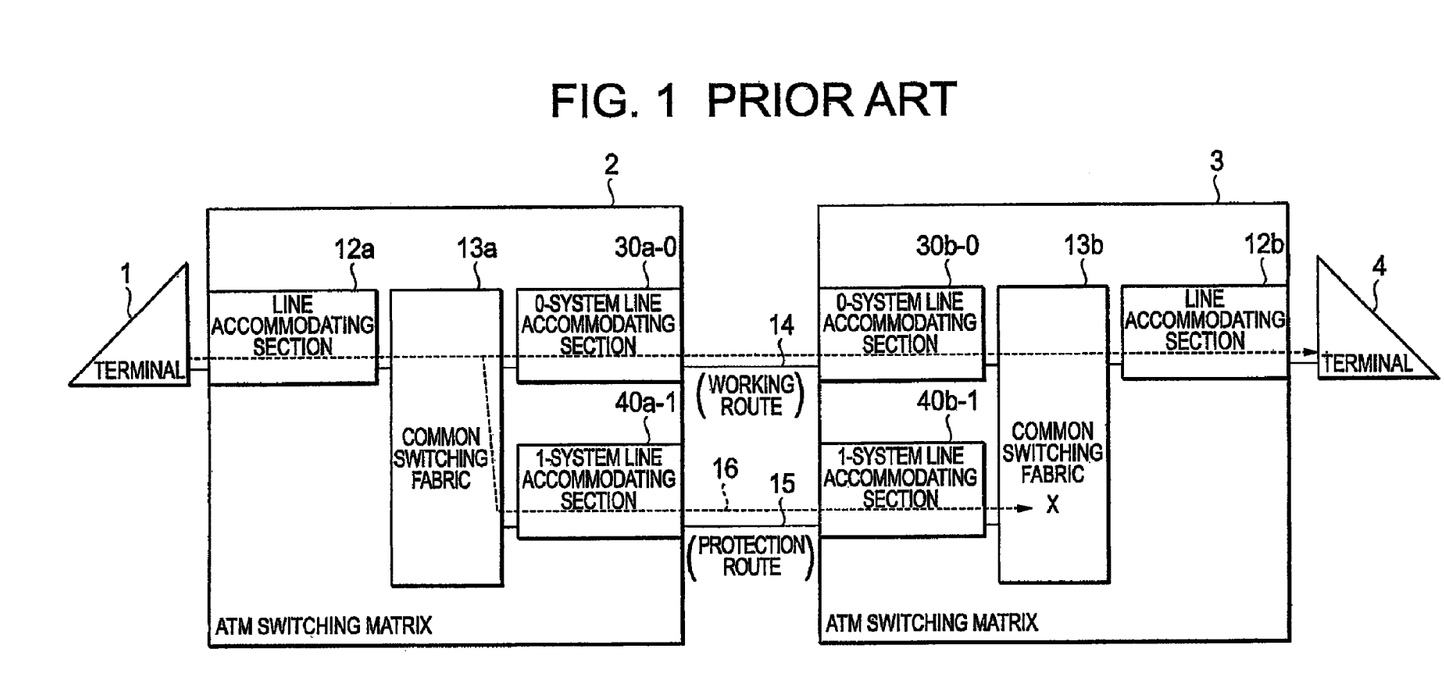
FIG. 1 is a block diagram showing the overall arrangement of a conventional line redundant system to explain a conventional line redundant scheme for ATM switching matrixes and the system therefor.

FIG. 1 shows an example of the overall arrangement of the system in a case wherein terminals 1 and 4 communicate with each other. The terminals 1 and 4 communicate with each other through ATM switching matrixes 2 and 3. Dual transmission paths are set between the ATM switching matrixes 2 and 3 by APS based on the (1+1) scheme. Dotted lines 16 indicate the flows of data signals sent out from the terminal 1 to the terminal 4. Note that in FIG. 1, an illustration of the flows of data signals from the terminal 4 to the terminal 1 is omitted.

Figure 2:
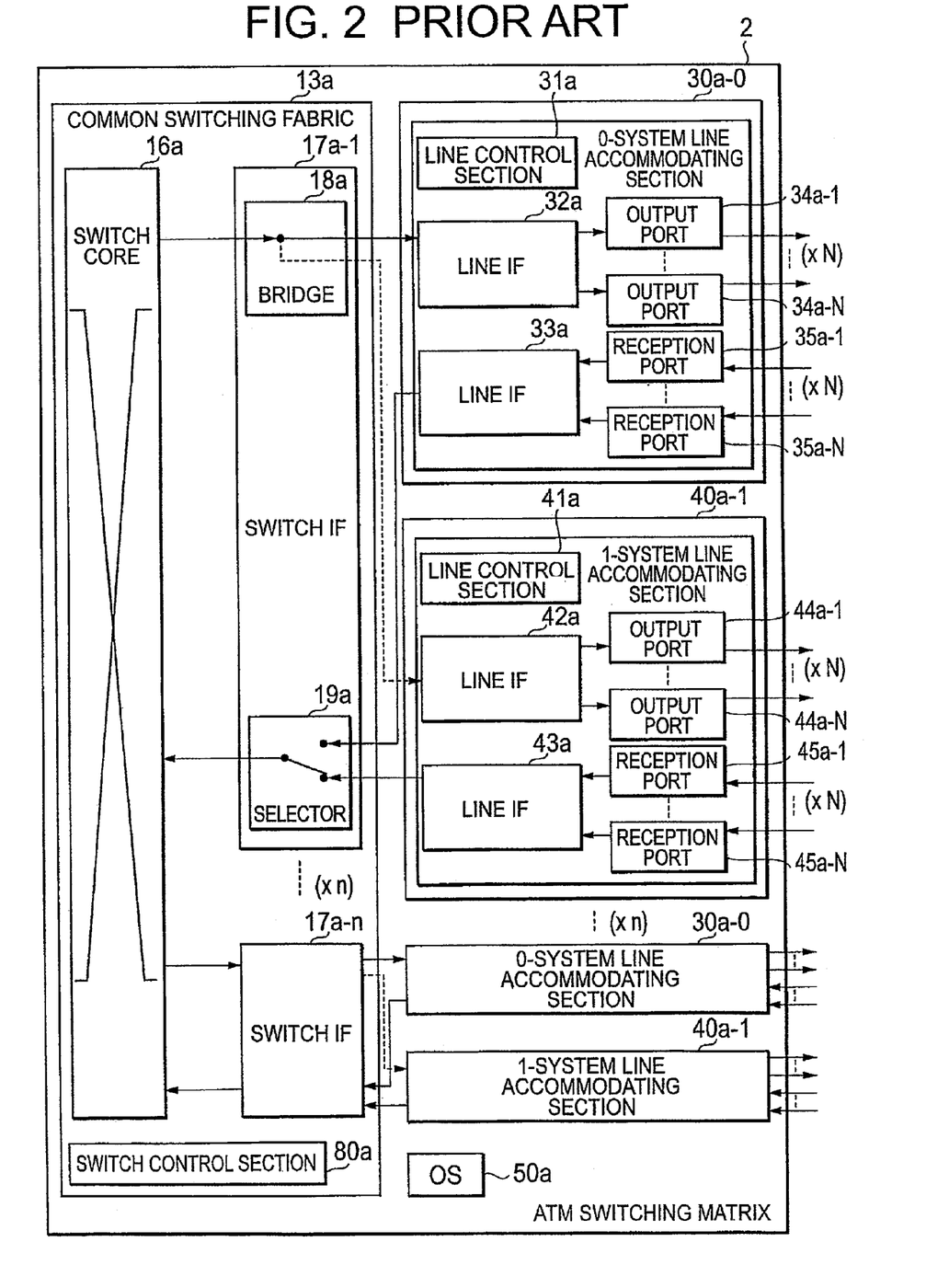
FIG. 2 is a block diagram showing the detailed arrangement of an ATM switching matrix 2 at the time of APS operation in the arrangement shown in FIG. 1.

FIG. 2 shows the detailed arrangements of a common switching fabric 13a, 0-system line accommodating section 30a-0, and 1-system line accommodating section 40a-1 of the ATM switching matrix 2 shown in FIG. 1. Note that FIG. 2 also shows the arrangement of a portion which receives data signals to be sent from the terminal 4 to the terminal 1.

Figure 3:
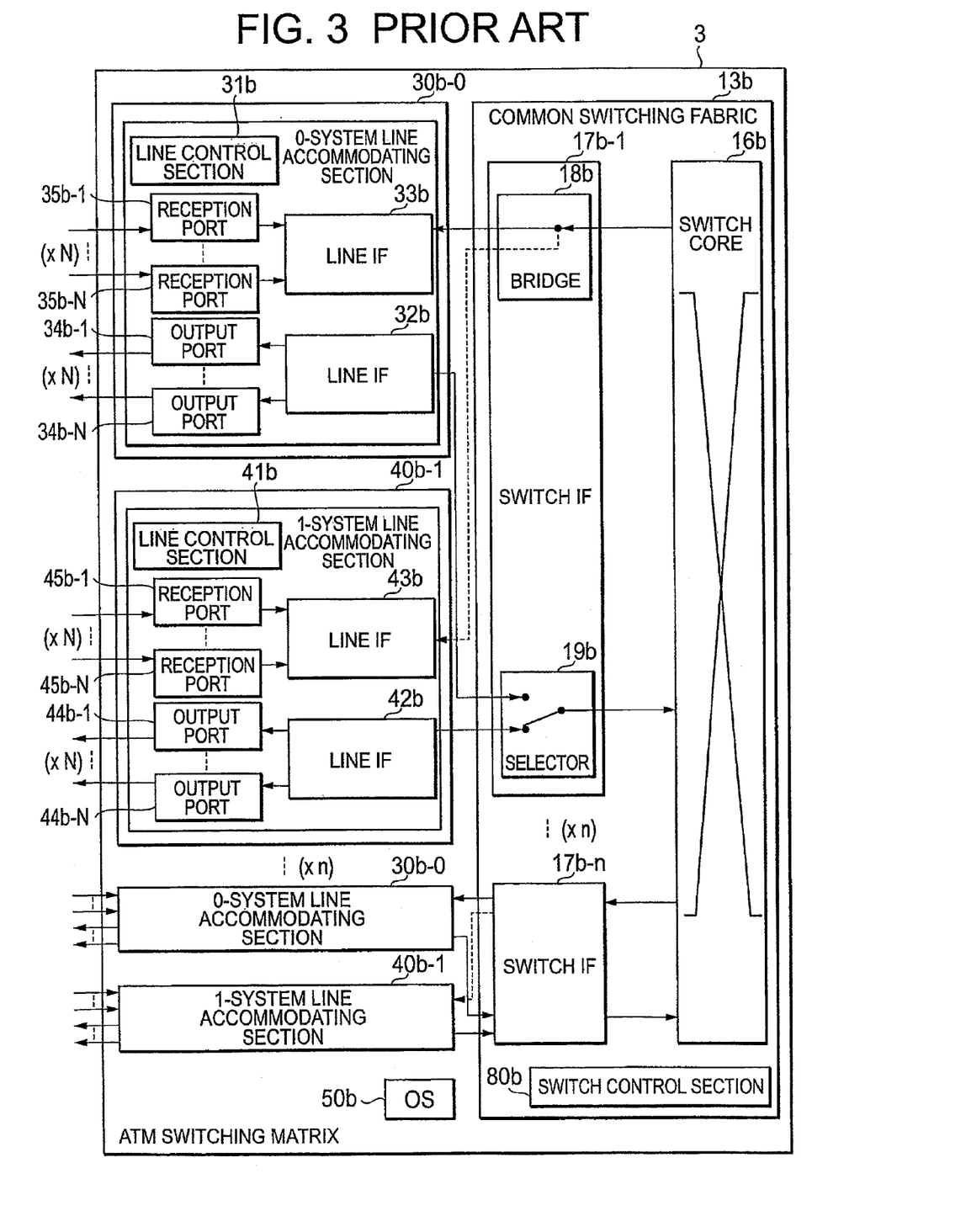
FIG. 3 is a block diagram showing the detailed arrangement of an ATM switching matrix 3 at the time of APS operation in the arrangement shown in FIG. 1.

FIG. 3 is a block diagram showing the detailed arrangement of the ATM switching matrix 3 in APS operation. In this case, the internal arrangement of the ATM switching matrix 3 is the same as that of the ATM switching matrix 2, and the letter added to the end of the reference numeral of each component is changed from a to b. The 0/1-system line accommodating sections 30a-0 and 40a-1 of the ATM switching matrix 2 are respectively connected to 0/1-system line accommodating sections 30b-0 and 40b-1 of the ATM switching matrix 3. A selector 19b in FIG. 3 exhibits a state after APS operation; the selector 19b selects an output from the 1-system line accommodating section 40b-1 and cuts off an output from the 0-system line accommodating section 30b-0.

As is obvious from FIGS. 1 and 2, the data signal transmitted from the terminal 1 is input to the ATM switching matrix 2 through a line accommodating section 12a and bridged (distributed) to the 0-system line accommodating section 30a-0 and 1-system line accommodating section 40a-1 by the common switching fabric 13a. The resultant signals are then output to a working route 14 and protection route 15, respectively.

As is obvious from FIGS. 1 and 3, the data signal input from the working route 14 to the ATM switching matrix 3 arrives at the terminal 4 through the 0-system line accommodating section 30b-0, a common switching fabric 13b, and a line accommodating section 12b. On the other hand, the data signal input from the protection route 15 to the ATM switching matrix 3 is input to the common switching fabric 13b through the 1-system line accommodating section 40b-1, but the output to the line accommodating section 12b is cut off by the selector (19b in FIG. 3) in the common switching fabric 13b.

The detailed arrangement of a conventional APS scheme will be described with reference to FIG. 2. Assume that a general technique is used as a switching control function using K1/K2 bytes. A description about the detection of a trouble in the working route and the exchange of control information with opposite ports by using K1/K2 bytes after the detection will therefore be omitted.

Referring to FIG. 2, the ATM switching matrix 2 is constituted by the common switching fabric 13a, the 0-system line accommodating section 30a-0, the 1-system line accommodating section 40a-1, and an OS (Operating System) 50a. The line accommodating sections are comprised of transmission/ input interfaces (to be referred to as line IFs hereinafter) 32a and 33a (Q-system side) and 42a and 43a (1-system side), output ports 34a-1 to 34a-N (0-system side) and 44a-1 to 44a-N (1-system side) for accommodating a plurality of lines (N lines for each line IF in FIG. 2), input ports 35a-1 to 35a-N (0-system side) and 45a-1 to 45a-N (1-system side), and line control sections 31a and 41a which perform APS control, together with the OS 50a, by using opposite ports and K1/K2 bytes of SONET frames in APS operation.

The output ports 34a-1 to 34a-N and 44a-1 to 44a-N and input ports 35a-1 to 35a-N and 45a-1 to 45a-N are constituted by an optical module (not shown), a framer (not shown) for interfacing between a physical layer and an ATM layer, and the like. The respective pairs of 0/1-system transmission/input ports in the 0-system line accommodating section 30a-0 and 1-system line accommodating section 40a-1 are connected to switch IFs 17a-1 to 17a-n to realize a redundant arrangement.

For example, referring to FIG. 2, each of the pairs of output ports (34a-1 and 44a-1), . . . , (34a-N and 44a-N) and of input ports (35a-1 and 45a-1), . . . , (35a-N and 45a-N) has an APS redundant arrangement.

The common switching fabric 13a is comprised of a switch core 16a, switch IFs 17a-1 to 17a-n, and switch control section 80a. The switch core 16a has 2n interfaces on the transmission/reception side for the switch IFs 17a-1 to 17a-n and switches ATM cells from the respective switch IFs. The switch IFs 17a-1 to 17a-n connect the interfaces of the common switching fabric 13a to the 0/1-system line accommodating sections in pairs. The switch control section 80a controls the dual redundant arrangement in cooperation with the OS 50a.

A bridge 18a and selector 19a are accommodated in the switch IFs 17a-1 to 17a-n. The bridge 18a has a function of simultaneously distributing a data signal from the switch core 16a to the 0-system line accommodating section 30a-0 to the 1-system line accommodating section 40a-1. The selector 19a has a cutoff function of inhibiting an unselected data signal from being input to the switch core 16a by selecting one of the 0/1-system line accommodating section pair 30a-0 and 40a-1.

As is obvious from the detailed arrangement of the ATM switching matrix 3 in FIG. 3, the following problems arise when a plurality of output ports 34b-1 to 34b-N and 44b-1 to 44b-N and input ports 35b-1 to 35b-N and 45b-1 to 45b-N are accommodated on the plurality of line accommodating sections 30b-0 and 40b-1 a predetermined number of ports at a time, and a selector 19b (input cutoff circuit) exists in the switch IF 17b-1 in the common switching fabric 13b.

Even when only switching from the input port 35b-1 in the 0-system line accommodating section 30b-0 on the working route to the input port 45b-1 in the 1-system line accommodating section 40b-1 on the protection route is to be performed, since the selector 19b exists in the common switching fabric 13b, switching cannot be done on a input port basis. Hence, switching is done on a line accommodating section basis. As a consequence, the remaining input ports 35b-2 (not shown) to 35b-N in normal operation in the 0-system line accommodating section 30b-0 are also switched to the input orts 45b-2 (not shown) to 45b-N in the 1-system line accommodating section 40b-1. When such switching occurs, cell loss may occur in the input ports 35b-2 (not shown) to 35b-N which are normally operated.

In addition, since switching from the working route to the protection route is performed by the selector 19b, selectors 19b must be provided for all the switch IFs 17b-1 to 17b-n in the common switching fabric 13b. Consequently, the internal hardware arrangement of the common switching fabric 13b is complicated.

SUMMARY OF THE INVENTION

The present invention has been made in view of the foregoing circumstances in the prior art, and has for its object to provide a line redundant method which performs line switching based on the (1+1) APS scheme on a port basis by using a selector having a cutoff function of outputting/not outputting one data signal of a plurality of data signals input from a switching matrix, and a line redundant system for implementing the method.

In order to achieve the above object, according to the first aspect of the present invention, there is provided a line redundant method, comprising:

the bridge step of outputting a data signal to a plurality of redundant lines in a switching matrix; and the selector step of selecting only a data signal, of a plurality of data signals input from another switching matrix other than the switching matrix through the plurality of redundant lines, which is input through a redundant line required in the switching matrix, and not selecting the data signals input to the switching matrix through the lines other than the required redundant line.

In the first aspect, the selector step is implemented by using a framer function for the data signal.

In order to realize the above object, according to the second aspect of the present invention, there is provided a line redundant system, comprising:

bridge means for simultaneously outputting data signals to a plurality of grouped line accommodating sections connected to a common switching fabric in a switching matrix, and selector means for outputting only a data signal, of data signals input from another switching matrix other than the switching matrix to a plurality of grouped input ports in the line accommodating sections, which is required in the common switching fabric from the input port to the common switching fabric, and cutting off the data signals from other input ports other than the input port.

In the second aspect, the selector means is implemented by using a framer provided for the input port.

With the above arrangement, when line switching is performed by the (1+1) APS scheme, the selector function of cutting off a data signal output from a line accommodating section in the protection route to the common switching fabric can be implemented on a port basis. This eliminates the necessity of switch the remaining input ports during normal operation in the same line accommodating section, and hence prevents the occurrence of cell loss due to switching.

In addition, since each switch IF in the common switching fabric needs not have a selector, the hardware arrangement of the common switching fabric can be simplified as compared with the conventional schemes.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENT

A preferred embodiment of the present invention will be described below with reference to FIGS. 4 to 8.

Figure 4:
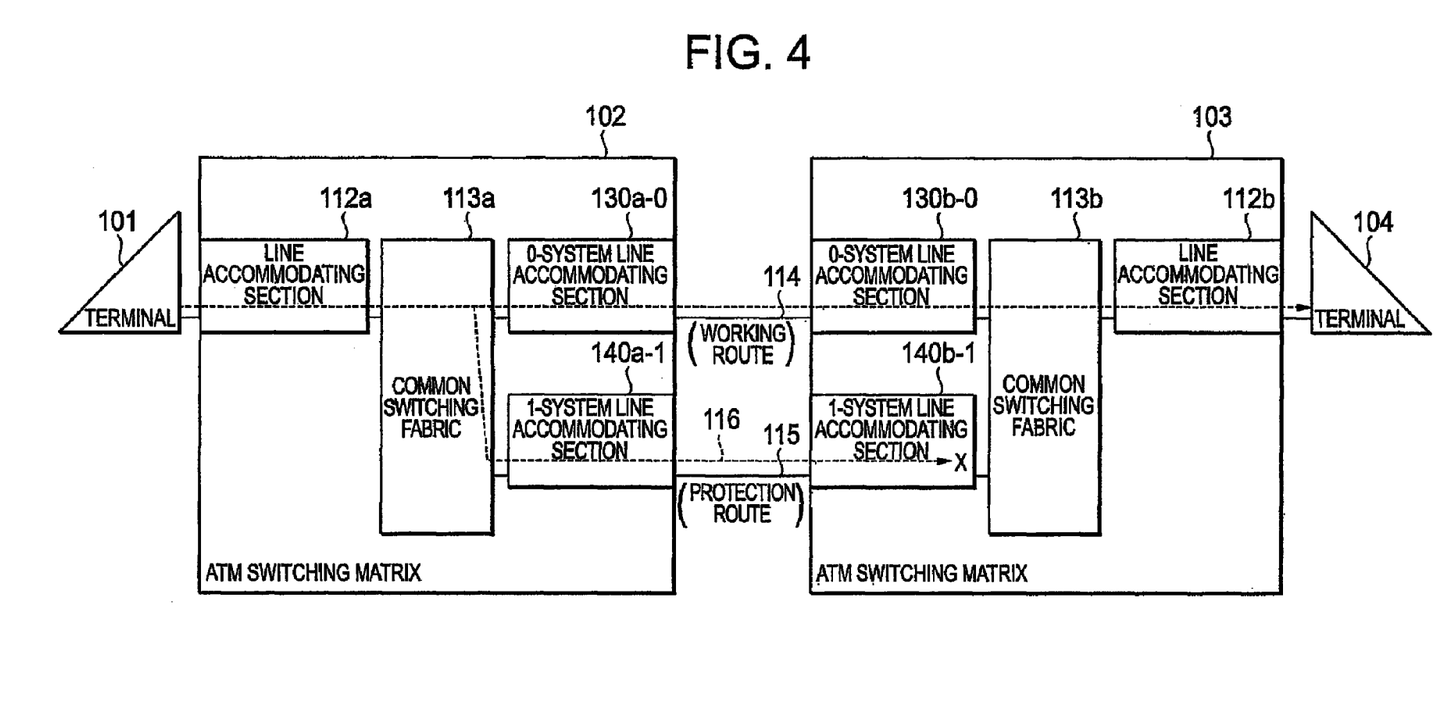
FIG. 4 is a block diagram showing the overall arrangement of a line redundant system to explain a line redundant scheme for ATM switching matrixes and the system therefor according to an embodiment of the present invention.

FIG. 4 shows an example of the overall arrangement of a system in a case wherein terminals 101 and 104 communicate with each other. Note that in the present invention, as in the prior art, a description about the detection of a trouble in the working route and the exchange of control information with opposite ports by using K1/K2 bytes after the detection, which are general techniques, will be omitted.

Figure 5:
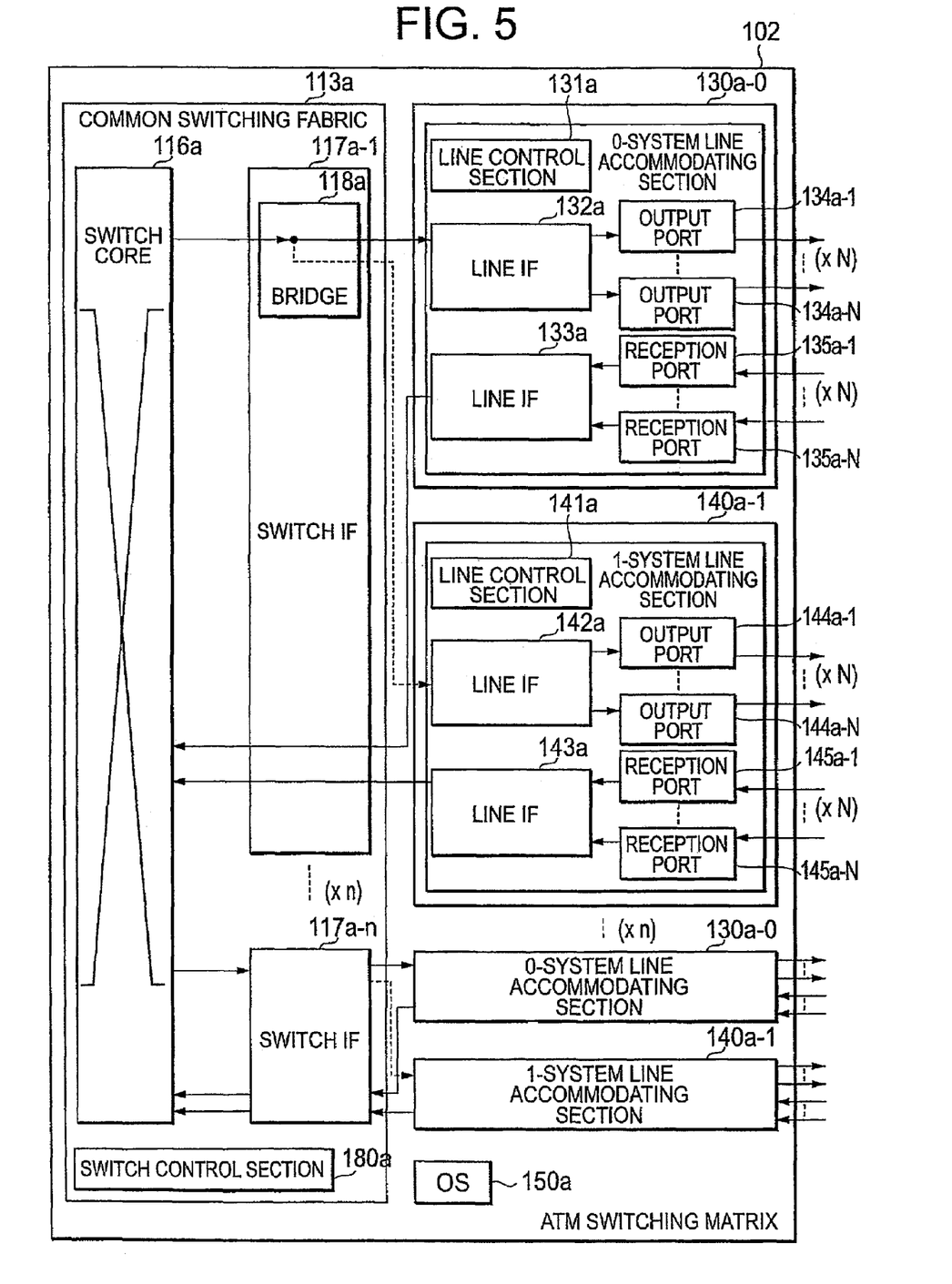
FIG. 5 is a block diagram showing the detailed arrangement of an ATM switching matrix 102 at the time of APS operation in the arrangement shown in FIG. 4.

FIG. 5 shows the detailed arrangements a common switching fabric 113a, 0-system line accommodating section 130a-0, and 1-system line accommodating section 140a-1 in APS operation in an ATM switching matrix 102 in FIG. 4. The ATM switching matrix 102 is constituted by the common switching fabric 113a, the 0-system line accommodating section 130a-0, the 1-system line accommodating section 140a-1, and an OS 150a for controlling the ATM switching matrix 102. Each line accommodating section accommodates a plurality of lines (N lines for each line IF in FIG. 5). The common switching fabric 113a is comprised of switch IFs 117a-1 to 117a-n each of which accommodates one pair of 0-system line accommodating section 130a-0 and 1-system line accommodating section 140a-1, a switch core 116a for analyzing the header information of a data signal and distributing the information to each line accommodating section, and a switch control section 180a. Each switch IF accommodates a bridge 118a which simultaneously distributes data from the switch core 116a to the 0-system line accommodating section 130a-0 to the 1-system line accommodating section 140a-1. Note that the operation of the bridge 118a is the same as that of the bridge 18a in the prior art, and hence a description thereof will be omitted.

Figure 6:
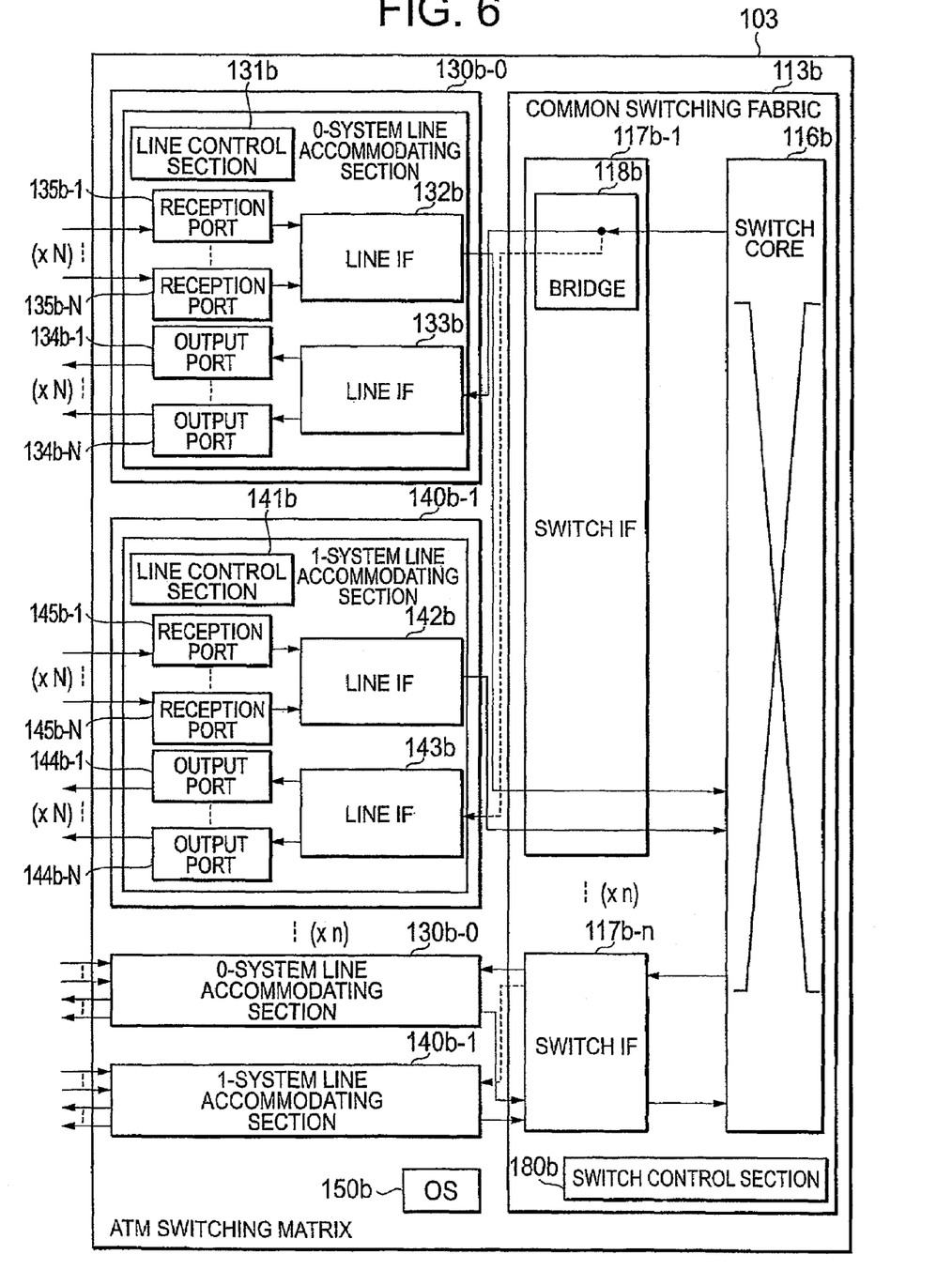
FIG. 6 is a block diagram showing the detailed arrangement of an ATM switching matrix 103 at the time of APS operation in the arrangement shown in FIG. 4.

FIG. 6 shows the detailed arrangements of a common switching fabric 113b, 0-system line accommodating section 130b-0, and 1-system line accommodating section 140b-1 in APS operation in the ATM switching matrix 103 in FIG. 4. The arrangement of the embodiment of the present invention shown in FIG. 6 differs from that of the prior art shown in FIG. 3 in that a selector function is implemented, at the time of switching, for the data signals respectively input from the ATM switching matrix 102 and ATM switching matrix 2 to an ATM switching matrix 103 and ATM switching matrix 3 through a protection route 115 and protection route 15.

In the prior art shown in FIG. 3, the selector function is implemented on the common switching fabric 13b side in the ATM switching matrix 3. In contrast, in the embodiment of the present invention shown in FIG. 6, the selector function is implemented at input ports 135b-1 to 135b-N in the 0-system line accommodating section 130b-0 and input ports 145b-1 to 145b-N in the 1-system line accommodating section 140b-1.

For example, the following are the details of the selector function in a case wherein after a trouble occurs in a working route 114, the data signal received by the 0-system input port 135b-1 through the working route 114 is cut off, and the data signal received by the 1-system input port 145b-1 through the protection route 115 is switched to be output to the common switching fabric 113b side.

The switching control function using K1/K2 bytes, an OS 150b for controlling the ATM switching matrix 103, and a line control section for a 0-system line control section 131b and 1-system line control section 141b cooperate with each other to determine a specific one of the 0-system input port 135b-1 and 1-system input port 145b-1 from which a data signal should be output. When the occurrence of a trouble in the working route 114 is detected, the OS 150b and the line control section cooperate with each other to generate control signals so as to cut off the data signal output from the input port 135b-1 through the 0-system line control section 131b and output a data signal from the input port 145b-1 through the 1-system line control section 141b.

That is, in the present invention, when the data signal bridged on the transmission side is input and a trouble occurs in the working route, line switching control is performed such that the data signal output from the 0-system input port of the pair of 0- and 1-system input ports is cut off, and the 1-system input port whose output has been cut off is allowed to output a data signal. In this manner, the selector function is implemented.

The above selector function can be implemented by, for example, SONET framers that are originally provided for the input ports 135b-1 to 135b-N and 145b-1 to 145b-N.

A SONET framer has a determination function of determining whether or not to output a data signal from the SONET framer as well as a function of assembling ATM cells into a SONET frame. The selector function can therefore be implemented by using the determination function.

Note that not only SONET framers but also many commercially available framers have the function of inhibiting an input data signal from being output to the common switching fabric side. Therefore, in units other than ATM switching matrixes incorporating SONET framers, the data signals input to various framers can be cut off (selected) for each port in a line accommodating section before the outputting of the signals to the common switching fabric side by using the same function of the framers in the ports.

The arrangement of the present invention eliminates the necessity of the selectors 19b (see FIG. 3) respectively arranged in the switch IFs 17b-1 to 17b-n on the common switching fabric 13b, and can simplify the hardware arrangement of the common switching fabric 113b as indicated by a switch IF 117b-1 in FIG. 6. Note that the use of this function has no influence on the remaining ports accommodated in the same system.

As described above, when it is necessary to perform line switching from the input port 135b-1 in the working route in the 0-system line accommodating section 130b-0 to the input port 145b-1 in the protection route in the 1-system line accommodating section 140b-1, only the corresponding ports can be switched. That is, since the remaining input ports 135b-2 (not shown) to 135b-N during normal operation in the 0-system line accommodating section 130b-0 in which the reception circuit port 135b-1 is accommodated are not forcibly switched to the reception circuit ports 145b-2 (not shown) to 145b-N in the 1-system line accommodating section 140b-1, cell loss does not easily occur in lines input to the input ports 135b-2 (not shown) to 135b-N during normal operation.

To allow data signals to pass through the ATM switching matrixes 102 and 103, path setting must be done in advance. This path setting is performed such that 0- and 1-system line accommodating sections are paired.

Figure 7:
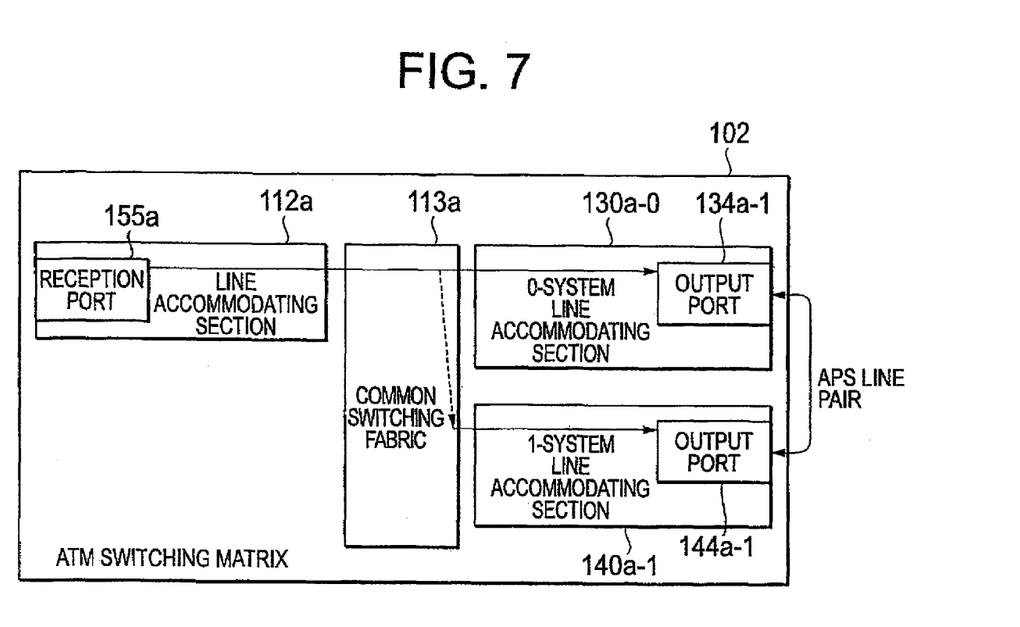
FIG. 7 is a block diagram showing an example of path setting on the transmission side of an APS line.

FIG. 7 shows an example of path setting on the transmission side of an APS line. As is obvious from FIG. 7, a path is established from a input port 155a of a line accommodating section 112a to a output port 134a-1 of the 0-system line accommodating section 130a-0. On the transmission side, a switch IF (not shown) in the common switching fabric 113a bridges (distributes) a data signal from the 0-system side to output it to the 1-system line accommodating section 140a-1 as well. Even if, therefore, the 0-system line accommodating section 130a-0 is extracted, path setting for a switch core (not shown) in the common switching fabric 113a is performed with respect to the 0-system line accommodating section 130a-0. That is, in the 0-system line accommodating section 130a-0, path setting is performed from the switch core to the output port 134a-1. In addition, in the 1-system line accommodating section 140a-1 to which the data signal from the 0-system side is bridged, path setting is also performed for a input port 144a-1 from the switch core (not shown).

Figure 8:
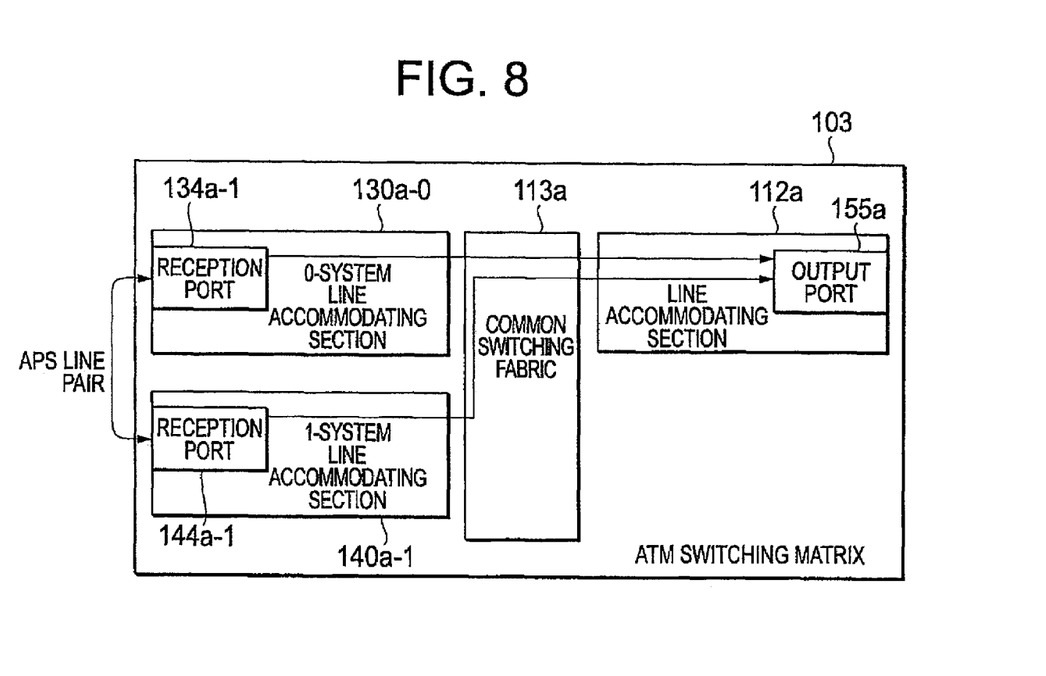
FIG. 8 is a block diagram showing an example of path setting on the reception side of the APS line.

FIG. 8 shows an example of path setting on the reception side of an APS line. As is obvious from FIG. 8, a path is established from the input port 134a-1 of the 0-system line accommodating section 130a-0 to an output port 155a of a line accommodating section 112a. At the same time, a path is established from the input port 144a-1 of the 1-system line accommodating section 140a-1, which pairs up with the above port, to the output port 155a of the line accommodating section 112a.

As described above, path setting is always performed on both the transmission and reception sides of line accommodating section pairs. Note that when one of an APS line accommodating section pair is extracted, and the other is inserted, the OS that controls the ATM switching matrix performs path setting for the inserted line accommodating section again by using path setting for a line accommodating section that is not extracted.

In the above description, an ATM switching matrix is used as a switching matrix, and an ATM cell is used as a data signal. However, the switching matrix and data signal are not limited to those described above as long as they comply with the APS specifications. For example, the present invention can also be applied to a line redundant scheme in an IP over SONET system which directly transmits IP packets through a SONET network.

What is claimed is:

1. A network device, comprising:
  a first input port to receive a first data signal, via a first working route between two terminals, and to selectively forward the first data signal towards a switching fabric;
  a first framer, implemented at the first input port, to assemble the first data signal into one or more frames, and to use a first determination function to determine whether to forward the first data signal to the switching fabric, when the first data signal is being received normally via the first working route, or to cut-off forwarding of the first data signal to the switching fabric when the first data signal is being received abnormally via the first working route;
  a second input port to receive a second data signal, via a first backup route between the two terminals, and to selectively forward the second data signal towards the switching fabric; and
  a second framer, implemented at the second input port, to assemble the second data signal into one or more frames, and to use a second determination function to determine whether to forward the second data signal to the switching fabric, when the first data signal is being received abnormally via the first working route, or to cut-off forwarding of the second data signal to the switching fabric when the first data signal is being received normally via the first working route, where the second input port is different from the first input port.

2. The network device of claim 1, further comprising:
  a line interface coupled between the first and second input ports and the switching fabric.

3. The network device of claim 1, further comprising:
  an operating system to control operation of the first and second input ports.

4. The network device of claim 1, where each of the first and second framers provides an interface between a physical layer and an Asynchronous Transfer Mode (ATM) layer.

5. The network device of claim 1, where the first and second framers comprise synchronous optical network (SONET) framers.

6. The network device of claim 1, further comprising:
  a third input port to receive a third data signal, via a second working route between the two terminals, and to selectively forward the third data signal towards the switching fabric;
  a third framer, implemented at the third input port, to assemble the third data signal into one or more frames, and to use a first determination function to determine whether to forward the third data signal to the switching fabric, when the third data signal is being received normally via the second working route, or to cut-off forwarding of the third data signal to the switching fabric, when the third data signal is being received abnormally via the second working route;
  a fourth input port to receive a fourth data signal, via a second backup route between the two terminals, and to selectively forward the fourth data signal towards the switching fabric; and
  a fourth framer, implemented at the fourth input port, to assemble the fourth data signal into one or more frames, and to use a second determination function to determine whether to forward the fourth data signal to the switching fabric, when the third data signal is being received abnormally via the second working route, or to cut-off forwarding of the fourth data signal to the switching fabric, when the third data signal is being received normally via the second working route, where the fourth input port is different from the third input port.

7. The network device of claim 1, where the switching fabric includes:
  N switch interface sections, where N is an integer; and
  a switch core having 2N interfaces.

8. The network device of claim 1, where the first and second data signals comprise Asynchronous Transfer Mode (ATM) data.

9. A method comprising:
  receiving a first data signal at a first input port of a network device via a first working route between two terminals;

receiving a second data signal at a second input port of the network device via a first backup route between the two terminals;

forwarding, using a first determination function of a first framer, the first data signal in the network device, via the first input port, when the first data signal is being received normally via the first working route;

cutting-off forwarding, using the first determination function of the first framer, of the first data signal in the network device at the first input port, when the first data signal is being received abnormally via the first working route;

forwarding, using a second determination function of a second framer, the second data signal in the network device, via the second input port, when the first data signal is being received abnormally via the first working route; and cutting-off forwarding, using the second determination function of the second framer, of the second data signal at the second input port in the network device, when the first data signal is being received normally via the first working route, where the second input port is different from the first input port.

10. The method of claim 9, further comprising:

receiving a third data signal at a third input port of the network device via a second working route between the two terminals;

receiving a fourth data signal at a fourth input port of the network device via a second backup route between the two terminals;

forwarding, using a third determination function of a third framer, the third data signal in the network device via the third input port, when the third data signal is being received normally via the second working route;

cutting-off forwarding, using the third determination function of the third framer, of the third data signal in the network device at the third input port when the third data signal is being received abnormally via the second working route;

forwarding, using a fourth determination function of a fourth framer, the fourth data signal in the network device via the fourth input port, when the third data signal is being received abnormally via the second working route; and cutting-off forwarding, using the fourth determination function of the fourth framer, of the fourth data signal at the fourth input port in the network device, when the third data signal is being received normally via the second working route, where the fourth input port is different from the third input port.

11. The method of claim 9, where the network device comprises a switching matrix.

12. The method of claim 11, where the switching matrix processes Asynchronous Transfer Mode (ATM) data.

13. The method of claim 9, further comprising:

controlling the forwarding at the first and second input ports based on a signal transmitted from an operating system of the network device.

14. The method of claim 9, where the first and second framers comprise synchronous optical network (SONET) framers.

15. The method of claim 9, where the first and second data signals comprise Asynchronous Transfer Mode (ATM) data.

16. A system comprising:

a network device to:

receive a first data signal at a first input port of the network device via a working route between two terminals;

receive a second data signal at a second input port of the network device via a backup route between the two terminals;

forward, using a first determination function of a first framer, the first data signal in the network device via the first input port, when the first data signal is being received normally via the working route;

cut-off forwarding, using the first determination function of the first framer, of the first data signal in the network device at the first input port, when the first data signal is being received abnormally via the working route;

forward, using a second determination function of a second framer, the second data signal in the network device via the second input port, when the first data signal is being received abnormally via the working route; and cut-off forwarding, using the second determination function of the second framer, of the second data signal at the second input port in the network device, when the first data signal is being received normally via the working route, where the second input port is different from the first input port.

17. The system of claim 16, where the network device comprises a switching matrix.

18. The system of claim 17, where the switching matrix processes Asynchronous Transfer Mode (ATM) data.

19. The system of claim 16, where the network device is further to:

control the forwarding at the first and second input ports based on a signal transmitted from an operating system of the network device.

20. The system of claim 16, where the first and second framers comprise synchronous optical network (SONET) framers.

21. The system of claim 16, where the first and second data signals comprise Asynchronous Transfer Mode (ATM) data.

* * * * *